United States Patent
Teufel et al.

(10) Patent No.: US 12,030,080 B2
(45) Date of Patent: Jul. 9, 2024

(54) METHOD OF PORTIONING PASTY MASSES BY MEANS OF FILLING MACHINE AND FILLING FLOW DIVIDER

(71) Applicant: ALBERT HANDTMANN MASCHINENFABRIK GMBH & CO. KG, Biberach (DE)

(72) Inventors: Daniel Teufel, Schemmerhofen (DE); Torsten Liermann, Laupheim (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 582 days.

(21) Appl. No.: 16/864,925

(22) Filed: May 1, 2020

(65) Prior Publication Data
US 2020/0346241 A1 Nov. 5, 2020

(30) Foreign Application Priority Data
May 3, 2019 (EP) .................................... 19172533

(51) Int. Cl.
| | | |
|---|---|---|
| *A21C 5/00* | (2006.01) | |
| *A21C 3/04* | (2006.01) | |
| *A21C 11/16* | (2006.01) | |
| *A22C 7/00* | (2006.01) | |
| *A22C 11/02* | (2006.01) | |
| *A23P 30/20* | (2016.01) | |

(Continued)

(52) U.S. Cl.
CPC .............. *B05C 5/0225* (2013.01); *A21C 3/04* (2013.01); *A21C 5/006* (2013.01); *A21C 11/16* (2013.01); *A22C 7/00* (2013.01); *A22C 11/0254* (2013.01); *A23P 30/20* (2016.08); *B05C 11/1026* (2013.01); *B05C 11/1039* (2013.01)

(58) Field of Classification Search
None
See application file for complete search history.

(56) References Cited

U.S. PATENT DOCUMENTS

| | | | |
|---|---|---|---|
| 3,945,785 A | | 3/1976 | Belshaw et al. |
| 3,947,178 A | * | 3/1976 | Belshaw .............. A21C 11/166 425/287 |

(Continued)

FOREIGN PATENT DOCUMENTS

| | | |
|---|---|---|
| CN | 204417083 U | 6/2015 |
| CN | 106163675 A | 11/2016 |

(Continued)

OTHER PUBLICATIONS

China National Intellectual Property Administration, Office Action and Search Report Issued in Application No. 202010358293.6, Jun. 20, 2022, 32 pages.

(Continued)

*Primary Examiner* — Lien T Tran
(74) *Attorney, Agent, or Firm* — McCoy Russell LLP (57) ABSTRACT

The present invention relates to a method and a filling machine for portioning pasty masses for the purpose of food production, wherein a pasty mass is fed by the filling machine into the filling flow divider, where it is separated into a plurality of mass flows and discharged in portions in the discharge direction. At the end of each portion the mass flow is sucked back in a direction opposite to the discharge direction.

11 Claims, 9 Drawing Sheets

(51) Int. Cl.
    *B05C 5/02*     (2006.01)
    *B05C 11/10*    (2006.01)

(56) References Cited

U.S. PATENT DOCUMENTS

| 11,044,917 | B1* | 6/2021 | Feldman | A21C 11/004 |
| 2012/0240783 | A1* | 9/2012 | Daburger | A47J 31/461 |
| | | | | 137/197 |

FOREIGN PATENT DOCUMENTS

| DE | 2033537 | A1 | 4/1972 |
| EP | 683981 | A1 | 11/1995 |
| WO | 2012094240 | A1 | 7/2012 |
| WO | 2014106627 | A1 | 7/2014 |

OTHER PUBLICATIONS

China National Intellectual Property Administration, Office Action and Search Report Issued in Application No. 202010358293.6, Jun. 29, 2021, 22 pages. (Submitted with Partial Translation).

* cited by examiner

METHOD OF PORTIONING PASTY MASSES BY MEANS OF FILLING MACHINE AND FILLING FLOW DIVIDER

CROSS REFERENCE TO RELATED APPLICATION

The present application claims priority to European Patent Application No. 19172533.2 filed on May 3, 2019. The entire contents of the above-listed application is hereby incorporated by reference for all purposes.

TECHNICAL FIELD

The present invention relates a method of portioning pasty masses for food production as well as to a filling machine, in particular for carrying out the method.

BACKGROUND AND SUMMARY

Methods of portioning pasty masses for food production and corresponding filling machines with filling flow dividers are already known from the prior art. In the case of these methods and machines, products are portioned, i.e. delivered in portions, e.g. onto a conveyor belt or into containers. In this process, a pasty mass is fed by a filling machine to a filling flow divider, where it is separated into a plurality of mass flows and discharged in portions. When the filling flow divider (and/or the feed mechanism of the filling machine) stops between the respective portions, the air content of e.g. up to 10% in the pasty mass has the effect that, due to the expansion of the pressurized filling material in an area upstream of the filling tube end, the filling material overruns. This leads to a poor accuracy of weight or to a poor separation of successive portions, i.e. the portions are not sufficiently separated from one other but merge into one another.

However, also the use of discharge or shut-off valves for preventing the above described overrun of the pasty mass entails considerable drawbacks. Installing e.g. piston or rotary piston valves is costly and increases the amount of space required. In addition, the discharge speed depends on the piston speed and this has a negative effect on the production speed. In addition, a safety housing around the valve is required. Also in the case of small portions, difficulties arise due to a large dead volume. Moreover, the mass must separate from the piston, and this depends on the consistency of the mass and is also problematic in the case of small portions. Finally, a large disassembly and assembly effort arises, in particular for cleaning.

Taking the above as a basis, it is the object of the present invention to provide a method for portioning a pasty mass as well as a filling machine for carrying out the method, by means of which a pasty mass can be portioned easily while preventing the product from overrunning and while reliably separating the individual portions from one another.

According to the present invention, this object is achieved by the features of claims 1 and 9.

According to the present invention, the mass flow is sucked back in a direction opposite to the discharge direction at the end of each portion. Due to the fact that the mass flow is sucked back, overrunning of the pasty mass caused by expansion can be prevented effectively. This can be realized in a simple and cost-effective manner without any need for additional discharge or shut-off valves.

Due to the fact that overrunning can be prevented, exact portion separation is accomplished and, consequently, a higher portioning performance and an improved weight accuracy can be realized in combination with a substantial saving of costs. In comparison with the known valve technology, a higher cyclic output can be achieved here. In addition, the simple structural design also allows easy and quick cleaning. Furthermore, a high placement accuracy is accomplished due to smaller adherent surfaces. When tubes or hoses are used, only the circular ring surface can have an adherent effect. The adherent effect produced is considerably smaller than that of a piston. Here, only the cohesive force of the mass within the mass flow must be overcome in order to separate the individual portions from one another.

Moreover, in comparison with the known valve technology, also special safety measures can be dispensed with. Since, according to the present invention, there are no large dead volumes in comparison with valve technology, the method according to the present invention is superior, especially when low product weights are involved, in particular with regard to weight accuracy. Thus, the present invention allows to deal with very small quantities as well as with higher portion weights.

"At the end of a portion" means at the tear-off point to the subsequent portion. This means that a predetermined volume $V_1$ has been fed in the discharge direction, e.g. by a respective dosing element of the filling flow divider, such that a portion volume $V_p$ corresponding to one portion can be discharged at the discharge end of the filling flow divider and is thus separated from the subsequent portion. This means that, at the end of the portion, the mass flow is briefly sucked back in a direction opposite to the discharge direction A, whereupon the predetermined volume $V_1$, which corresponds to the volume of a portion plus the sucked-back volume $V_r$, is again fed in the discharge direction A. In the case of low-viscosity masses, such as jam, it may, due to leakage, be necessary to suck back more than 100% of the internal volume of the respective line downstream of the dosing element.

According to a preferred embodiment, the separated mass flows pass, in the filling flow divider, through respective dosing elements for adjusting the volume flow, the respective dosing element running backwards at the end of the portion, i.e. when a certain volume has been conveyed through the dosing element. This means that sucking back is effected through backward-running dosing elements. The dosing elements may here be driven e.g. via a motor. For example, the dosing elements may be configured as servo-driven pumps. Preferably, the dosing elements are driven via a joint drive. A joint drive is cost-effective and serves to keep the volume flow through the various discharge lines constant.

However, it is also possible to use dosing elements that are driven by the product itself. Such dosing elements are configured, for example, as vane wheels, which rotate freely about an axle. If the dosing elements are then coupled to one another, and rotate e.g. about a joint axle, it can be ensured that the volume flow through the various discharge lines will be constant.

For the purpose of sucking back, the dosing elements can then preferably be moved via a unit in a direction opposite to the discharge direction A, e.g. by a unit for generating a vacuum in the joint line upstream of the dosing elements or via a respective drive or a movement mechanism acting on the individual axles or on the joint axle of the vane wheels. If a unit for generating a vacuum is provided, it can take over the function of the feed mechanism for sucking back and feed the sucked-off volume to the next portion, when said next portion is discharged.

Alternatively, sucking back can be effected by a respective unit for generating a vacuum in the respective line downstream of the dosing element in question, e.g. by a respective variable-volume cylinder, said cylinders being driven individually or jointly by an actuator. The respective quantity sucked back will then be discharged with the respective next portion.

According to a preferred embodiment, the feed mechanism of the filling machine feeds the pasty mass in portions to the filling flow divider, i.e. it does not run continuously.

It will be particularly advantageous, when also the feed mechanism runs backwards at the end of a portion $V_p$. Hence, also the feed mechanism of the filling machine can run backwards after having fed a certain volume $V_f$ in the discharge direction. The volume $V_f$ fed by the feed mechanism of the filling machine in the discharge direction A will then correspond to the volume of n discharged portions (when the flow is divided into n subflows by the filling flow divider) plus the volume $V_R$ sucked back by the feed mechanism. The volume $V_R$ sucked back by the feed mechanism can thus substantially correspond to the sum of the volumes $V_r$ sucked back by the dosing elements, i.e. n $V_r$. If, for example, dosing elements are used, which are driven by the product, it can be accomplished that, due to the vacuum generated by the backward-running feed mechanism, also these dosing elements will move backwards, e.g. that the vane wheels will rotate about the axle in a backward direction. If the friction is excessively high, the dosing elements can be moved backwards via a suitable unit, as explained above, e.g. by rotating the respective rotary axle or the joint rotary axle backwards.

In order to separate a portion from the subsequent portion, no specific separation unit is required. Separation can take place e.g. through tearing off caused by a relative movement of the discharged portion relative to the subsequent portion. This can be done e.g. by—sucking back and carrying along the discharged portion with a conveying unit, in particular a conveyor belt—a lifting movement of the filling flow divider—the weight force of the discharged portion. Hence, no additional mechanical parts are necessary for separating and singulating the portions, so that costs can be saved and the production speed can be increased in addition.

Advantageously, the discharge ends of the filling flow divider, in particular the ends of individual lines, especially tubes and/or hoses and/or nozzles, through which the portions are discharged, each have arranged thereon a self-closing membrane, in particular a slotted membrane, which closes when the pasty mass is sucked back and which automatically opens when the pasty mass moves in the discharge direction. Also a membrane of this kind prevents the product from overrunning, in particular in the case of low-viscosity masses. The tear-off point to the subsequent portion can then be at the membrane.

The present invention also relates to a filling machine, used in particular for carrying out the method and comprising a feed mechanism for feeding a pasty mass to a filling flow divider. The filling flow divider is configured such that it will be able to divide the pasty mass into a plurality of mass flows and discharge it in portions in the discharge direction. The filling flow divider comprises also a plurality of dosing units for adjusting the volume flow of the mass flows. The filling machine further comprises a control unit, which is configured such that and which controls the filling machine such that, at the end of each portion, the mass flow will be sucked back in a direction opposite to the discharge direction A.

The dosing elements are driven via a motor and in particular configured as a servo-driven pump, the dosing elements being preferably driven via a joint drive. Alternatively, the dosing elements may also be driven by the product and are preferably configured as vane wheels that rotate freely about an axle. According to a preferred embodiment, the dosing elements are coupled to one another.

The filling flow divider may preferably be configured such that, downstream of the dosing elements, lines, e.g. tubes and/or hoses and/or nozzles, are arranged, via which the respective mass flows are fed and discharged. According to a preferred embodiment, these lines, i.e. for example tubes and/or hoses and/or nozzles, are arranged so as to be movable relative to one another such that the distance at which the discharge ends are spaced apart is variable. The distance between the discharged products can thus be varied, without the necessity of exchanging the whole filling flow divider. A change of distance will be advantageous e.g. in cases where the portions are discharged into a container. When the size of the container is changed or when a change of product takes place, it may be advantageous to change also the distance between the portions.

According to an advantageous embodiment, the lines, i.e. in particular tubes and/or hoses and/or nozzles, are curved such that the free discharge ends thereof are directed downwards in the direction of a surface onto which portions are discharged. A discharge direction of this kind proved to be advantageous. The free discharge opening is here preferably located in a plane that is inclined by 0° to 60°, preferably by 0° to 45°, relative to a plane in which the surface onto which the portions are discharged lies.

According to an advantageous embodiment, at least a part of the lines is adapted to be rotated. Advantageously, the lines are preferably rotatable about at least a central axis, i.e. in the case of curved lines about the central axis at the beginning of the line, in particular of the tube and/or the hose and/or the nozzle.

According to an advantageous embodiment, lines having no controllable discharge or shut-off valves are arranged between the dosing units and the discharge ends of the filling flow divider.

According to an advantageous embodiment, the discharge end of the filling flow divider has arranged thereon a self-closing membrane, in particular a slotted membrane, which is able to close when the pasty mass is sucked back and to automatically open when the pasty mass moves in the discharge direction.

In the case of the method according to the present invention, the volume $V_r$ sucked back corresponds to 0.5% to 1000% of the internal volume of the respective line downstream of the dosing elements in question. This range proved to be advantageous for preventing the filling material from overrunning and for guaranteeing nevertheless a sufficient production speed. The volume sucked back is independent of the portion size and depends on the respective product, in particular on the viscosity of the latter and the internal volume of the line in question. The ideal volume to be sucked back and the ideal moment in time can be determined empirically for the respective product. For pasty masses having a high viscosity (or e.g. masses with $\eta > 10^4$ mPas at T=10° C.) and/or an air content <20%, a small volume sucked back, e.g. between 0.5 and 100% of the volume of the line, will be sufficient. For masses having a low viscosity (or e.g. $\eta < 10^5$ mPas at T=10° C.) and/or an air content >15%, the volume sucked back may be larger, e.g. larger than 100% of the volume of the line in question, so as to prevent overrunning. These ranges are product-dependent and cannot be strictly delimited from one another, so that the above-mentioned overlapping range is obtained. The ideal quantity to be sucked back is determined empirically.

BRIEF DESCRIPTION OF THE FIGURES

In the following, the present invention will be explained in more detail making reference to the following figures.

DETAILED DESCRIPTION

Figure 1:
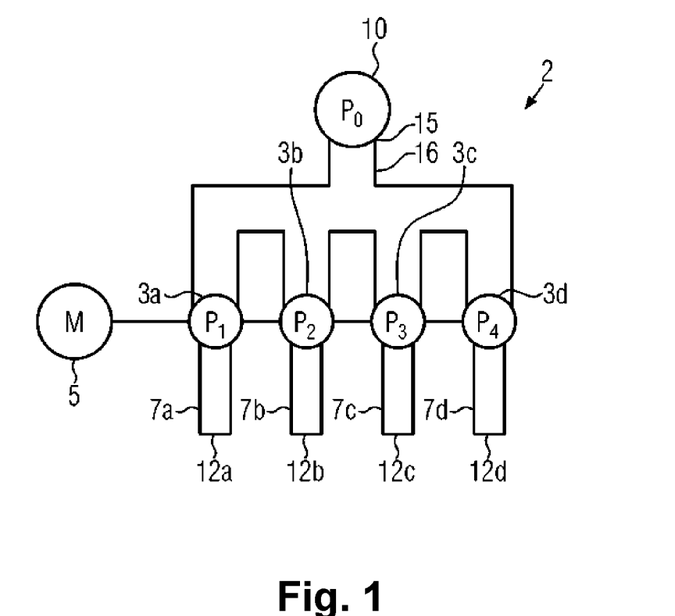
FIG. 1 shows, in a highly schematic representation, an embodiment according to the present invention.
Figure 2:
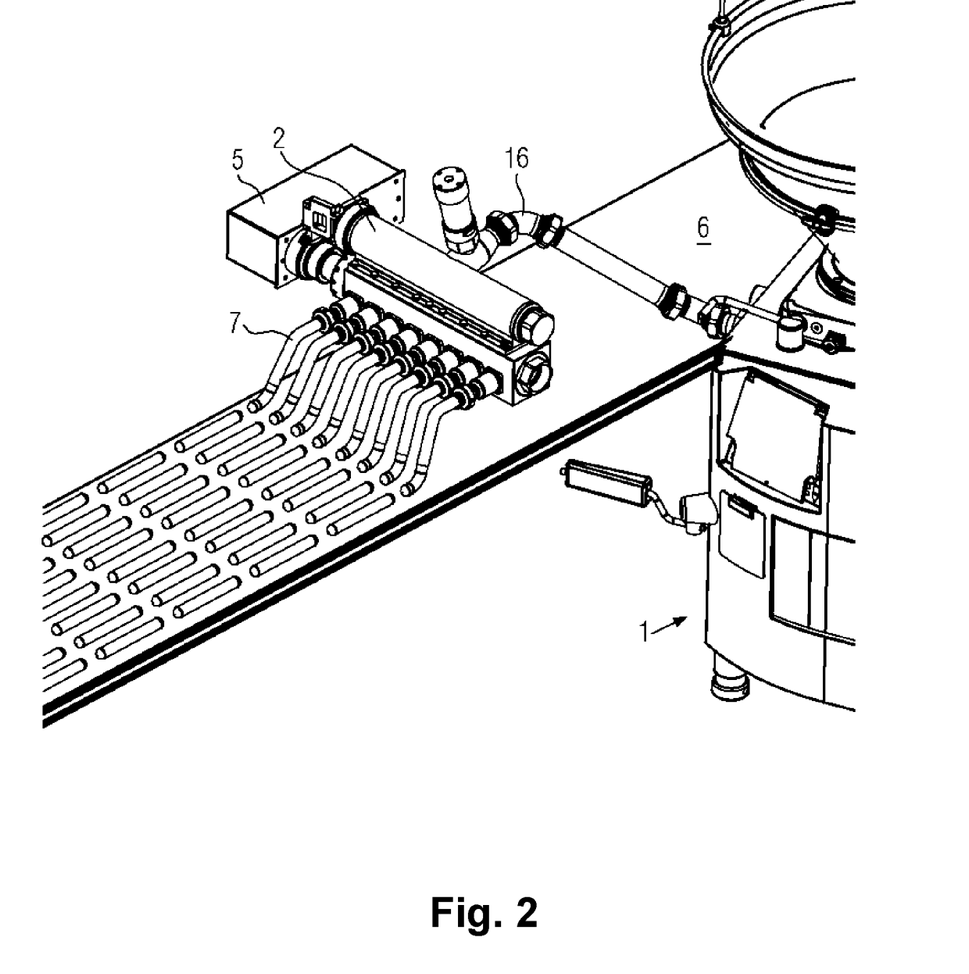
FIG. 2 shows, in a perspective view, a preferred embodiment according to the present invention.
Figure 6:
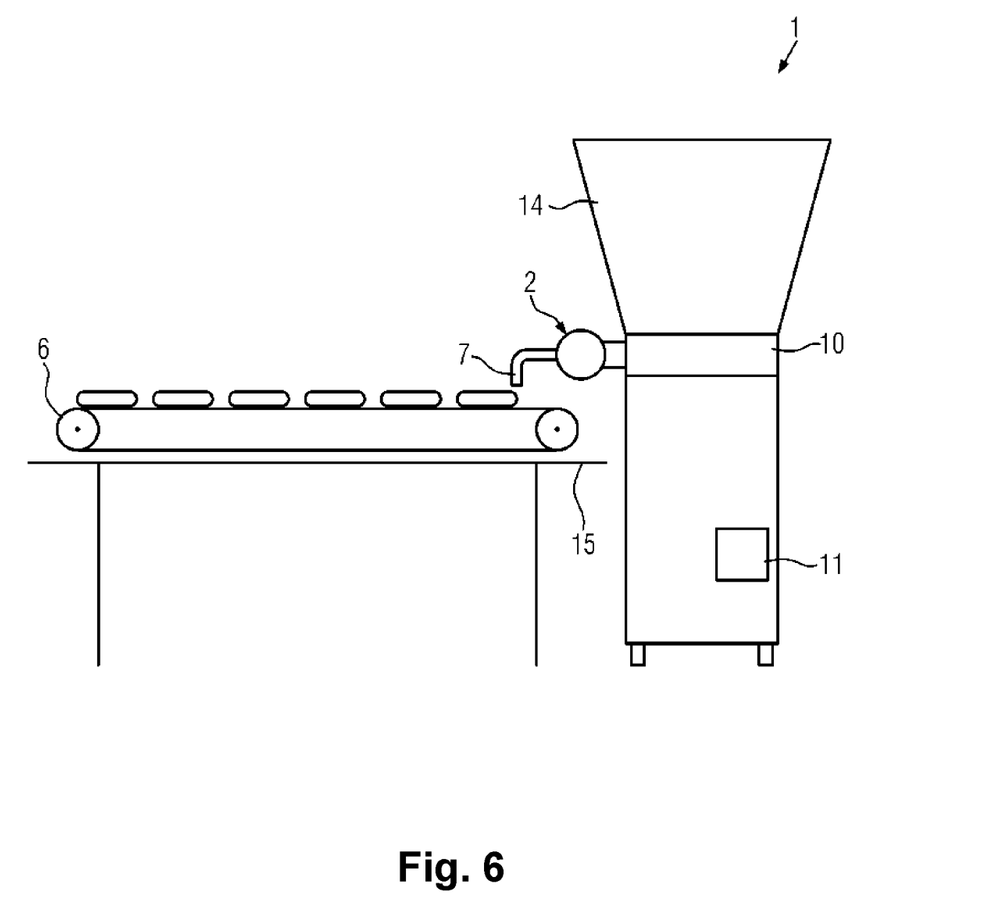
FIG. 6 shows, in a highly schematic representation, an embodiment according to the present invention with a conveyor belt downstream of the filling flow divider.

FIG. 6 shows a device according to the present invention. The filling machine 1 comprises a hopper 14 for receiving therein the pasty mass. The term pasty mass is here used e.g. for: sausage meat, dough, jam, creams, nut mass, etc. The filling machine 1 is e.g. a vacuum filler. The filling machine comprises a feed mechanism 10, which feeds the pasty mass to an outlet 15, e.g. an outlet tube. The feed mechanism may e.g. be a vane pump or a worm pump, etc. A filling flow divider 2 of the type shown e.g. also in FIGS. 1 and 2 is arranged downstream of the outlet 15 in the discharge direction. The filling flow divider divides the mass flow fed by the feed mechanism 10 into a plurality of n mass flows, e.g. four flows in FIG. 1, and e.g. eight flows in FIG. 2. To this end, the joint line 16 branches into a plurality of lines 7a, 7b, 7c, 7d.

To ensure a constant volume flow in the individual lines with the pressure drop, dosing elements 3a, b, c, d are arranged in the respective lines. In FIG. 1, the dosing elements are arranged schematically in the branching lines, but they may also be arranged at the beginning of the lines 7. The dosing units allow the volume flow to be adjusted in the respective lines. The dosing elements may be driven via a motor 5, preferably via a joint motor 5, and may e.g. be coupled such that there will be an equal volume flow in each line downstream of the respective dosing element.

The dosing elements 3a, b, c, d may also be driven by the product, i.e. the pasty mass, and may be configured e.g. as vane wheels, which rotate freely about an axle and are preferably coupled to one another, i.e. they rotate about a joint axle.

Figure 4:
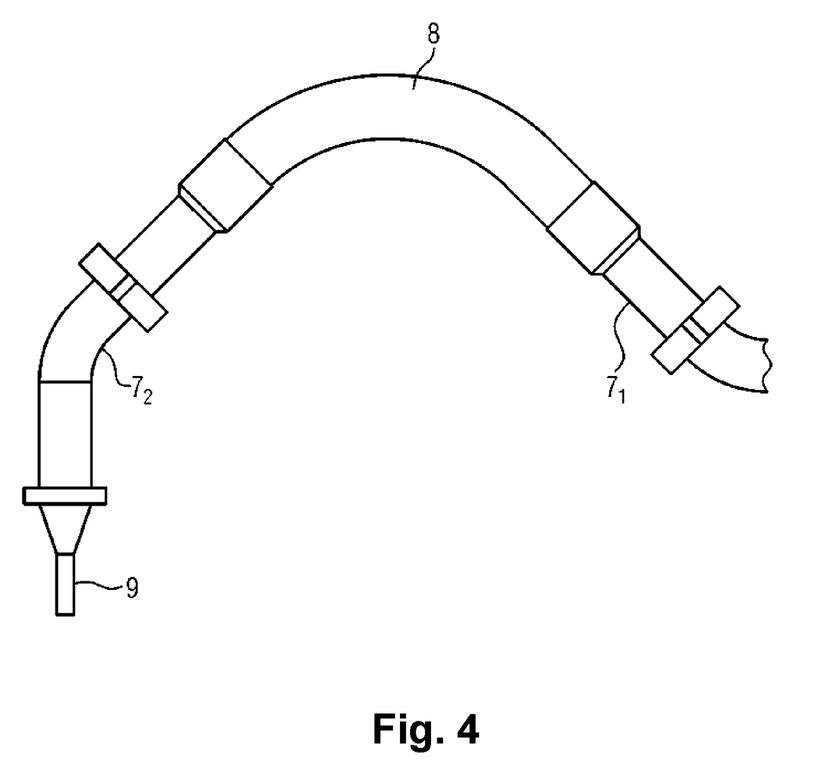
FIG. 4 shows schematically, in a perspective representation, tubes with hose connection according to a further embodiment of the present invention.

The dosing elements 3a, b, c, d are followed by the respective lines, e.g. tubes 7a, b, c, d and/or hoses 8a, b, c, d and/or nozzles 9a, b, c, d. As can be seen e.g. in FIG. 4, a respective line may be defined by a combination of a tube $7_1$, a hose 8, a tube $7_2$ and a nozzle 9. FIG. 4 shows e.g. two lines with hoses 8 that may be attached to a separate bar. The use of a hose allows, due to the flexibility, the lines to be bent and adjusted in a suitable manner. The lines can thus easily be positioned accurately. Moreover, the use of hoses is also cost-effective. Furthermore, hoses are also easy to manufacture and offer advantages as regards the lower weight.

Figure 3:
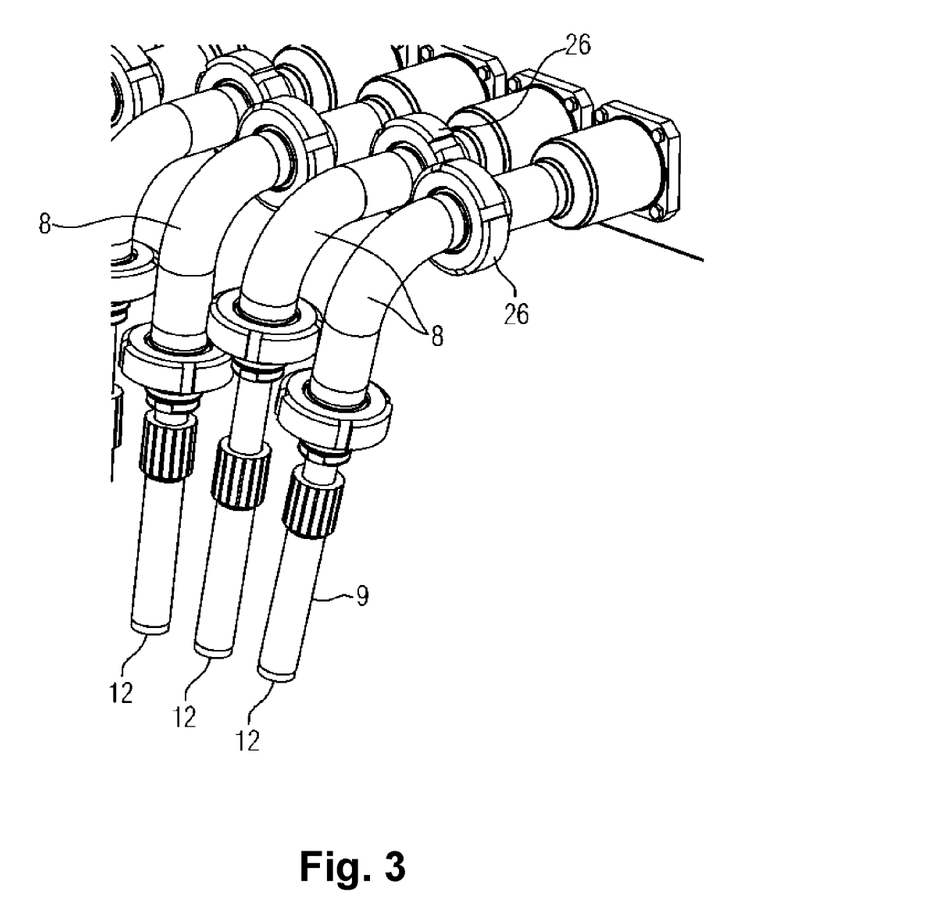
FIG. 3 shows, in a perspective view, a detail of a filling flow divider comprising rotatably fastened tubes.

FIG. 3 shows a further variant, in which the dosing elements 3 are arranged in a housing, with tubular connection pieces 26 projecting from the housing, which have attached thereto curved tubes 8a, 8b, here in combination with nozzles 9a, 9b. The curved tubes 8a, 8b are fastened in a rotatable manner. This means that the distance between the discharge ends 12 can be varied. The rotatably arranged curved tubes can then be fixed at the desired position.

The fact that the curved tubes 8a, 8b are curved allows the discharge end 12 and the free discharge area, respectively, to be directed downwards in the direction of a surface onto which the portions are discharged, the free discharge opening being located in a plane that is inclined by 0° to 60°, preferably by 0° to 45°, relative to a plane in which the surface onto which the portions are discharged lies. An arrangement of this kind proved to be advantageous, since the discharged product will then drop due to the force of gravity. The device according to the present invention does not necessitate the use of a specific separating unit for separating the individual portions. The separation can take place through tearing off caused by a relative movement of the discharged portion relative to the subsequent portion, in particular by carrying along the discharged portion with a conveying unit 6, here the conveyor belt 6. However, also a lifting movement of the filling flow divider allows tearing off. To this end, a lifting unit is provided, which is not shown here and via which the filling flow divider can move in a vertical direction relative to a surface and a conveying unit, respectively.

The filling machine according to the present invention also comprises a control unit 11, through which the filling machine 1 and its filling flow divider 2 are controllable. The control unit 11 may be integrated in the filling machine. The control unit in its entirety may, however, also be divided, so that one part of the control unit is arranged on the filling flow divider and the other part in the filling machine. Also the conveying unit 6 may be controlled via the control unit 11 or via a separate controller.

Figure 7A:
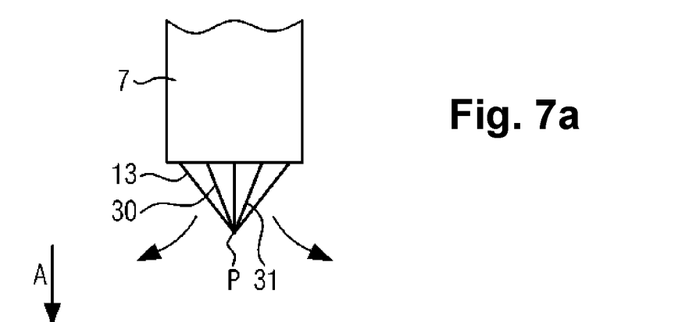
FIG. 7a, FIG. 7b, FIGS. 7c, and 7d show schematically embodiments comprising a self-closing membrane.

At the discharge end 12 of the filling flow divider, i.e. preferably at the discharge end of the lines 7, a self-closing membrane 13 may be arranged, which is shown in FIG. 7a, b, c, d. A membrane 13 of the type in question, here in particular a slotted membrane, opens when the pasty mass moves in a discharge direction A. In the course of this process, the membrane parts separated by slots move outwards, as shown by the arrows. Such a squeeze membrane is also used e.g. for plastic food containers, such as ketchup bottles.

Figure 7B:
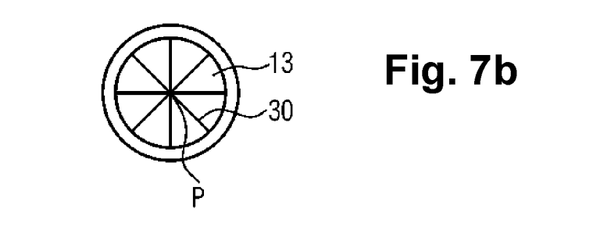
Figure 7C:
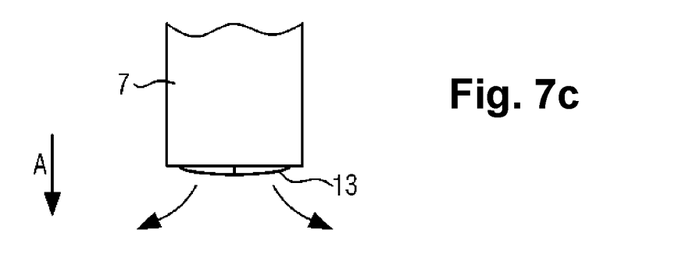
Figure 7D:
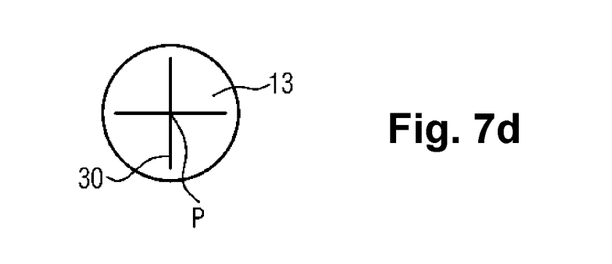

In the embodiment shown in FIG. 7a, the membrane comprises a hollow, outwardly directed protrusion 31, with slots 30 being located in the area of the protrusion and converging towards a point P. When pressure is applied to the membrane by the mass flow, the area between the slots 30 will open, as indicated by the arrows, and the passage opens. When the pressure decreases and the pasty mass is sucked back, the membrane parts will automatically close again (FIG. 7a, 7b). FIGS. 7c and d show a further embodiment, in which the membrane 13 is located e.g. substantially in one plane and has, as described above, a plurality of slots 30 that converge towards a point P. As indicated by the arrows, the membrane parts open outwards in response to pressure in the line 8 and close when, for example, the pressure decreases or the pasty mass is sucked back.

In order to discharge portions of exact weight without any pasty mass overrunning, the method following hereinafter is preferably executed.

Pasty material is filled into the hopper 14 and fed in the manner known via the feed mechanism in the direction of the filling flow divider 2. As explained in connection with FIG. 1, the mass flow is divided into a plurality of n mass flows in the filling flow divider 2, the volume flow being adjusted via dosing elements 3a, b, c, d, preferably such that the volume flow of all subflows is equal. To this end, the dosing elements can be driven in a suitable manner via a motor 5. The sum of the volume subflows corresponds here to the volume flow generated by the feed mechanism 10.

The pasty mass is then discharged from the lines 7 of the filling flow divider 2. At the end of each portion, the mass flow is sucked back in a direction opposite to the discharge direction.

"At the end of a portion" thus means at the tear-off point of the mass flow, i.e. the boundary to the following portion. This means that a portion volume $V_p$ corresponding to one portion can be discharged at the discharge end of the filling flow divider after a predetermined volume $V_1$ has been fed through the respective dosing elements in the discharge direction. This means that at the end of the portion $V_p$, the mass flow is briefly sucked back in a direction opposite to the discharge direction A, whereupon the predetermined volume $V_1$, which corresponds to the volume of a portion $V_p$ plus the sucked-back volume $V_r$, is again conveyed in the discharge direction A.

It will be particularly advantageous, when, at the end of a discharged portion $V_p$, also the feed mechanism 10 runs backwards in a suitable manner. Hence, also the feed mechanism of the filling machine can run backwards after having fed a certain volume $V_f$ in the discharge direction. The volume $V_f$ fed by the feed mechanism of the filling machine in the discharge direction A will then correspond to the volume of n discharged portions (when the flow is divided into n subflows by the filling flow divider) plus the volume $V_R$ sucked back by the feed mechanism 10. The volume $V_R$ sucked back by the feed mechanism can thus substantially correspond to the sum of the volumes $V_r$ sucked back by the dosing elements, i.e. n $V_r$. If, for example, dosing elements are used, which are driven by the product, it can be accomplished that, due to the vacuum generated by the backward-running feed mechanism, also these dosing elements will move backwards, e.g. that the vane wheels rotate about the axis in a backward direction or that the vane wheels are moved backwards by a separate unit.

Figure 5A:
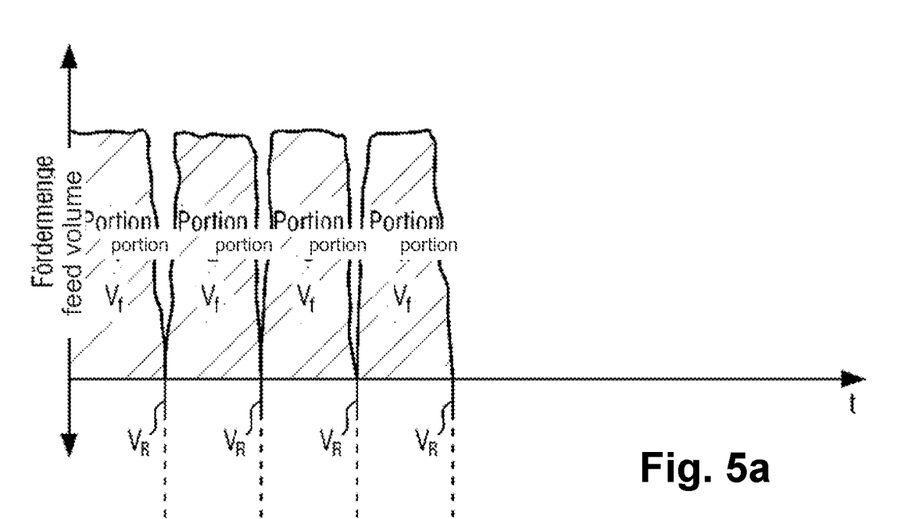
FIG. 5a and FIG. 5b show diagrams illustrating the feed volume of the feed mechanism of the filling machine and the feed volume of a dosing element as a function of time.
Figure 5B:
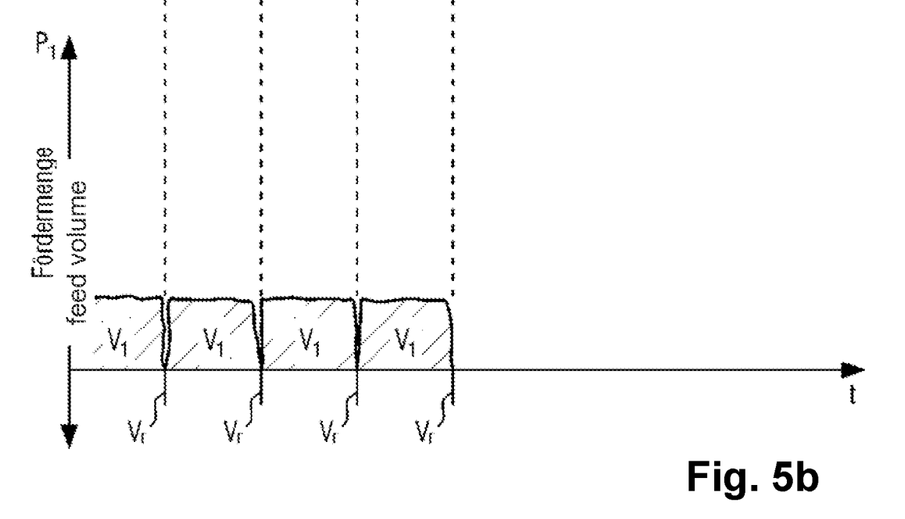

This means that the feed mechanism 10 and the dosing elements 3a, b, c, d feed, as can in particular also be seen from FIG. 5, a feed volume $V_f$ i.e. in FIG. 5 the area below the individual graphs. When a predetermined volume has been fed by the pump 10, the pump 10 starts to run backwards, as can be seen in FIG. 5a, thus sucking the pasty mass in a direction opposite to the discharge direction A. The volume $V_R$ sucked back by the pump 10 corresponds approximately to $n*V_r$, i.e. the volume sucked back by the dosing elements $3_n$ multiplied by the number n of dosing elements. The duration of the backward movement of the feed mechanism 10 is in a range of up to 1 second. FIG. 5b shows the feed volume as a function of time of a single dosing element 3a, b, c, d. As can be seen from FIG. 5, e.g. the feed volume $V_1$, which corresponds to the hatched area below the graphs, is e.g. 1/n, here a quarter of the total feed volume, n corresponding to the number of divided volume flows. When a respective volume $V_1$ has been conveyed by the dosing element 3a, the dosing element will also here run backwards, as can be seen in FIG. 5b. The volume $V_r$ sucked back corresponds here to 0.5% to 1000% of the volume in the line. This means that, in this embodiment, e.g. the volume sucked back by the feed mechanism substantially corresponds to the sum of the volumes $V_r$, sucked back by the dosing elements.

The embodiment shown in FIGS. 5a and 5b is only one example. The aspect of essential importance is that the feed volume, as shown in FIG. 5b, is sucked back at the end of a portion in a direction opposite to the discharge direction A so as to prevent the mass from overrunning. The operation of the feed pump 10 can be adapted such that the dosing units will always have fed thereto a sufficient amount of pasty mass.

FIG. 8a to e show, in a highly simplified representation, the chronological sequence of an embodiment according to the present invention.

Figure 8A:
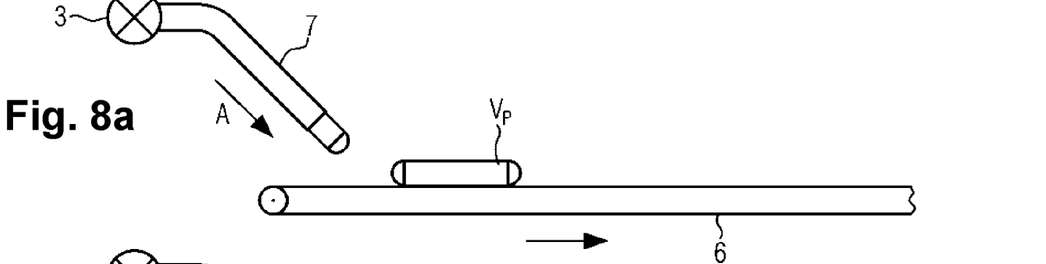
FIG. 8a, FIG. 8b, FIG. 8c, FIGS. 8d, and 8e show the chronological sequence of an embodiment of a method according to the present invention.
Figure 8B:
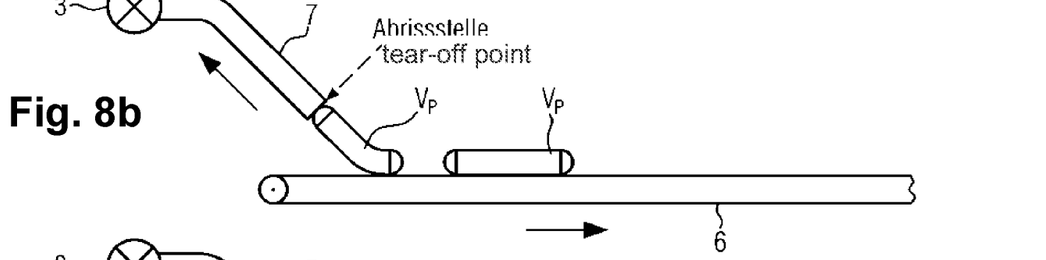

In FIG. 8a, a pasty mass is fed, as indicated by the arrow, in the discharge direction A via the respective dosing element 3 (and the pump 10, which is here not shown) through the line 7. The individual portions having a respective portion volume $V_p$ are conveyed via the conveyor belt 6. When the dosing element 3 in question has fed a certain volume $V_1$, the pasty mass will be sucked back, as indicated by the arrow in FIG. 8b. Due to the backward movement of the pasty mass and the conveying movement of the belt 6, the pasty mass will tear at the marked tear-off point at the end of the line 7.

Figure 8C:
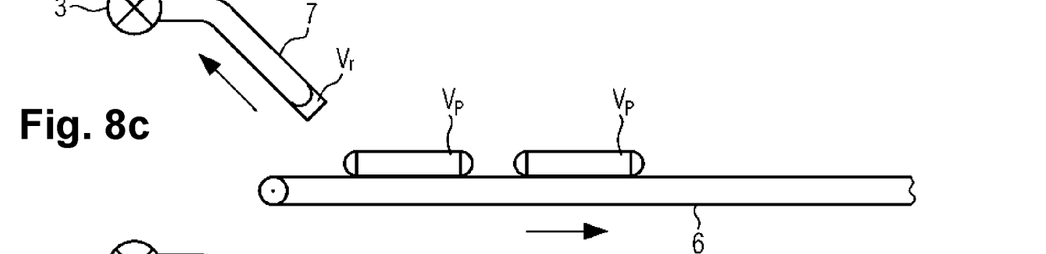

As shown in FIG. 8c, the portion then drops and the pasty mass has been sucked back into the line 7, i.e. a volume $V_r$ has been sucked back in a direction opposite to the discharge direction A.

Figure 8D:
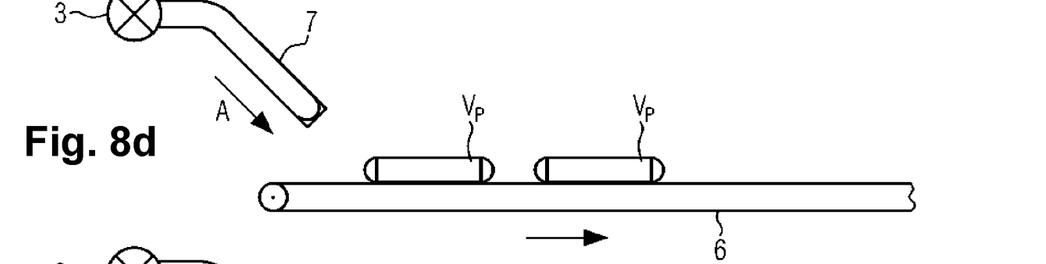
Figure 8E:
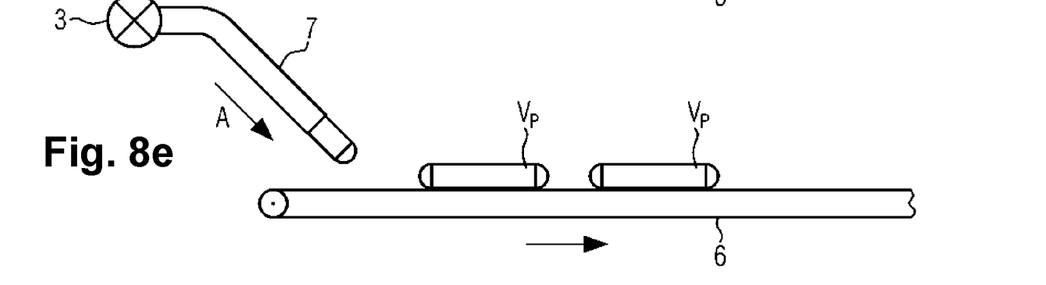

As shown in FIG. 8d, the pasty mass is then again moved via the dosing units 3 in the discharge direction A, and this is continued until, as shown in FIG. 8, a volume $V_1$ has been discharged again, where $V_1=V_p+V_r$. The operation of the feed mechanism is adapted accordingly, as has been explained hereinbefore.

If the tear-off point is arranged at the end of the line 7, sucking back will take place when a portion having the volume $V_p$ has been discharged from the line 7.

This, however, is not necessarily the case. FIGS. 9a to 9d show a further embodiment, where a less viscous mass is portioned, e.g. jam into a container 25.

Figure 9A:
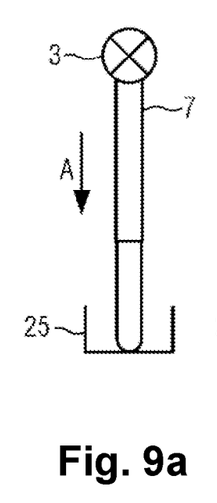
FIG. 9a, FIG. 9b, FIGS. 9c, and 9d show the chronological sequence of a further embodiment of a method according to the present invention.
Figures 9B, 9C:
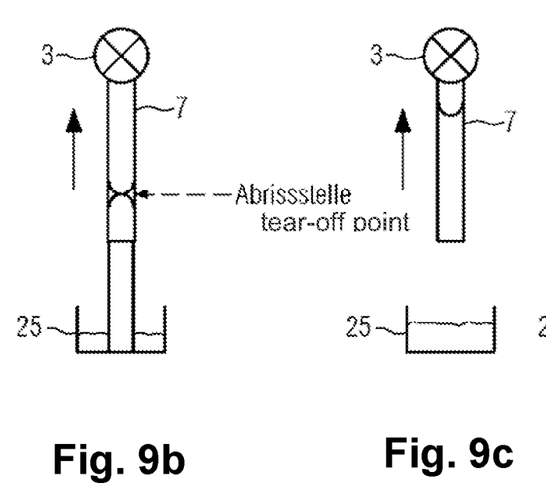
Figure 9D:
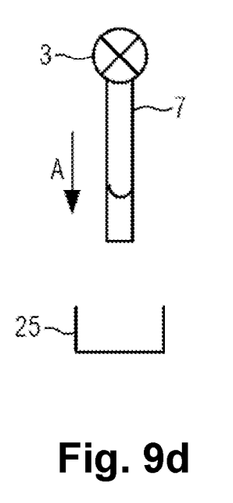

As can be seen from FIG. 9a, the pasty mass is moved in the discharge direction A via a dosing element 3. When a volume $V_1$ has been discharged, sucking back will take place in a direction opposite to the discharge direction A, as shown in FIG. 9b. The tear-off point may here be located in an area between the dosing element and the discharge end of the line 7. In this case, separation is caused by sucking back and by the force of gravity. When a sufficient quantity has been sucked back, i.e. $V_r$ as shown in FIG. 9c, the pasty mass can again be fed in the discharge direction A, as shown in FIG. 9d, and fed into the next container 25.

The quantity $V_r$ to be sucked back and the moment in time of sucking back can be determined empirically for a given product and depend in particular also on the desired portion size, feed rate, internal volume of the line as well as the arrangement.

In principle, it is also possible that, if the dosing units 3a, b, c, d are driven by the filling flow, the backward movement is generated exclusively via the vacuum of the feed mechanism 10 or a vacuum is generated in the discharge direction via respective vacuum lines upstream of the individual dosing elements. An essential aspect of the present invention is that at the end of a portion, i.e. when a respective volume $V_1$ has been fed by the filling flow divider, so that a portion volume $V_p$ can be discharged from the respective discharge end of the filling flow divider 2, the mass flow is sucked back in a direction opposite to the discharge direction so as to prevent overrunning.

The discharged portion is then automatically separated from the mass flow, since the adjoining pasty mass is sucked back, and tears. In particular, the separation is also caused by a relative movement between the portion and the subsequent portion, so that no movable parts will be necessary for separating the product. This allows a high cyclic output in comparison with valve technology. In the embodiment shown in FIG. 2, the portions are separated from one another by the force of gravity and/or by the movement of the conveyor belt 6.

The present invention is also particularly suitable for a co-extrusion unit, i.e. for a unit in which the individual portions produced in the lines have additionally applied thereto a co-extruded outer mass that is cured, if necessary. Due to the very small structural design, the product range can be considerably extended. In particular, the inner mass can be portioned precisely by means of the filling flow divider 2, i.e. very small quantities can be filled and separated in precise portions and small calibers can thus be realized.

Cleaning the system is very easy due to the simple structural design, in which no discharge or shut-off valves are arranged between the dosing units and the discharge ends 12, but only smooth, tubular inner walls come into contact with the pasty mass.

According to a further embodiment, in which the dosing elements run freely and are driven via the filling flow, the joint feed line 16 leading to the dosing elements is connected to a vacuum generating unit, so as to drive the respective dosing elements backwards. This unit may e.g. be configured as a variable-volume cylinder.

According to an additional embodiment with a non-driven filling flow divider, i.e. a filling flow divider in the case of which the dosing elements are driven via the filling flow, the axle of the filling flow divider connecting the dosing elements, e.g. the vane wheels, is connected via a freewheel to a unit, which allows to rotate the axle of the filling flow divider in a direction opposite to the discharge direction for the purpose of sucking back. Such a unit may comprise e.g. a pneumatic cylinder acting on the axle via a lever.

The invention claimed is:

1. A method of portioning pasty masses for food production by means of a filling machine and a filling flow divider, the method comprising:
    feeding a pasty mass into the filling flow divider by the filling machine;
    separating the pasty mass into a plurality of mass flows by the mass flow divider; and
    discharging portions from the filling flow divider in a discharge direction, wherein an end of each portion is a tear-off point between the portion and a subsequent portion, wherein
    at the end of each portion, when the portion is being discharged but is not yet separated from the subsequent portion via separation at the tear-off point between the portion being discharged from the filling flow divider in the discharge direction and the subsequent portion upstream in the filling flow divider, the portion being discharged is sucked back in a direction opposite to the discharge direction, thereby causing separation of the portion being discharged from the subsequent portion upstream in the filling flow divider and resulting in a discharged portion that is separated from the subsequent portion upstream in the filling divider, wherein
    in the filling flow divider, the separated plurality of mass flows pass through respective dosing elements for adjusting a volume flow, the respective dosing elements running backwards at the end of the portion as each of the plurality of mass flows is sucked back in the direction opposite to the discharge direction, wherein
    either the dosing elements are driven via a joint motor and are coupled such that there will be an equal volume flow in each line downstream of the respective dosing element, or the dosing elements are configured as vane wheels which rotate freely about an axle and the dosing elements are coupled to one another, and wherein
    the portions being discharged are separated from subsequent portions as follows:
        singulating, which is separating portions via only tearing off achieved by a relative movement of the portion being discharged relative to the subsequent portion by:
            carrying along the portion being discharged with a conveying unit, and/or
            a lifting movement of the filling flow divider or of discharge ends of the filling flow divider, and/or
            a gravitational forcing due to a weight force of the portion being discharged.

2. The method according to claim 1, wherein the dosing elements are driven via a motor.

3. The method according to claim 1, wherein:
    the dosing elements are driven by the pasty mass and are configured as vane wheels, which rotate freely about an axle,
    the dosing elements are coupled to one another, and
    the dosing elements are moved by a unit in the direction opposite to the discharge direction during the sucking back process.

4. The method according to claim 1, wherein a feed mechanism of the filling machine feeds the pasty mass in portions to the filling flow divider and runs backwards.

5. The method according to claim 1, wherein a volume sucked back by a feed mechanism corresponds substantially to a sum of volumes sucked back by dosing elements.

6. The method according to claim 1, wherein discharge ends of the filling flow divider include ends of individual lines, wherein the individual lines are tubes and/or hoses and/or nozzles through which the portions are discharged, have arranged thereon a self-closing membrane which closes when the pasty mass is sucked back and which automatically opens when the pasty mass moves in the discharge direction.

7. The method according to claim 1, wherein a volume sucked back corresponds to 0.5% to 1000% of an internal volume of respective lines downstream of respective dosing elements.

8. The method according to claim 1, wherein after a volume ($V_r$) has been sucked back via one of the respective dosing elements, a volume ($V_1$) is fed via the one of the respective dosing elements in the discharge direction, a portion volume being $V_p = V_r + V_1$, whereupon a volume ($V_r$) is again sucked back.

9. The method of claim 2, wherein the dosing elements are configured as servo-driven pumps.

10. The method of claim 9, wherein the dosing elements are driven via a joint drive.

11. The method of claim 6, wherein the self-closing membrane is a slotted membrane.

* * * * *